F. LANGE.
APPARATUS FOR ALINING RAIL ENDS.
APPLICATION FILED MAR. 18, 1910.
1,049,738.
Patented Jan. 7, 1913.
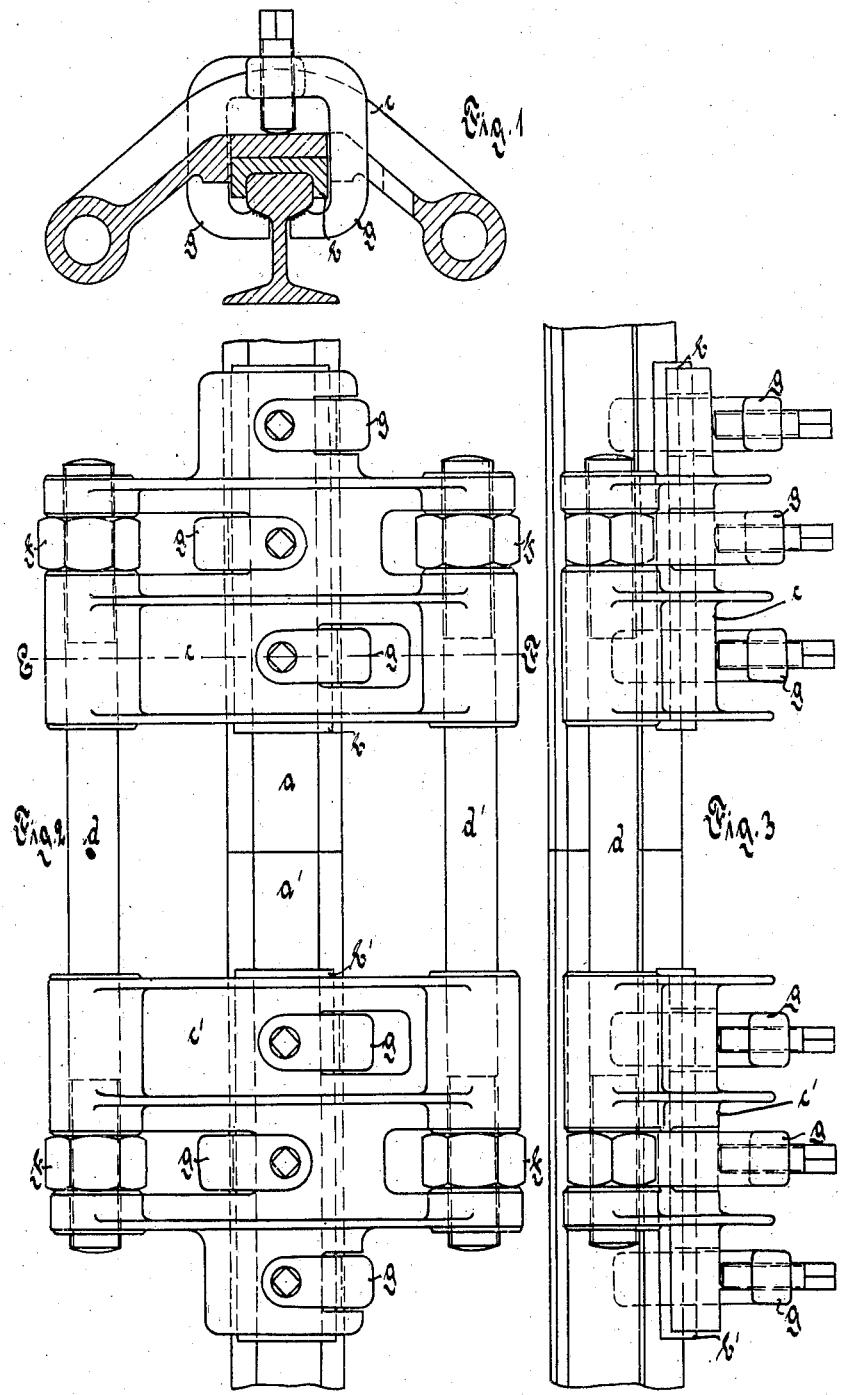
Witnesses:
Chas. F. Clagett
K. M. Cassidy
Inventor:
Felix Lange
by Chas. F. Dane
Attorney

UNITED STATES PATENT OFFICE.

FELIX LANGE, OF ESSEN-ON-THE-RUHR, GERMANY, ASSIGNOR TO TH. GOLDSCHMIDT, A FIRM COMPOSED OF KARL GOLDSCHMIDT AND HANS GOLDSCHMIDT, OF ESSEN-ON-THE-RUHR, GERMANY.

APPARATUS FOR ALINING RAIL ENDS.

1,049,738.  Specification of Letters Patent.  Patented Jan. 7, 1913.

Application filed March 18, 1910. Serial No. 550,201.

*To all whom it may concern:*

Be it known that I, FELIX LANGE, a subject of the King of Prussia, German Emperor, and resident of Essen-on-the-Ruhr, in the German Empire, have invented a new and useful Apparatus for Alining Rail Ends for the Purpose of Bringing Them into Position for Welding, of which the following is an exact specification.

My invention relates to an apparatus for alining rail-ends for the purpose of bringing them into position for welding, as by butt-welding, and especially to apparatus of this type in which means is provided for producing relative longitudinal movement of the rail-ends after they are properly alined.

The invention is especially adapted for use in connection with the welding of rails together by the aluminothermic process, in which it is of the utmost importance that the ends to be joined be accurately alined in order to produce a good and satisfactory joint.

In apparatus of this class as heretofore constructed the devices employed therein have usually been adapted to engage the web portions of the rails, that is, the portions between the head and the foot of each rail, and in such cases it has sometimes been difficult to bring the tread surfaces of adjoining rail-ends into accurate alinement, especially in cases where there has been any difference, however slight, in the shapes of the cross-sections of such rails.

The apparatus constituting the subject matter of this invention is distinguished from apparatus heretofore employed for alining rail-ends chiefly by reason of the fact that the alining means employed has guide surfaces or alining surfaces which engage directly the tread surfaces of the rails and gage the positions thereof, and when the gaging is from these tread surfaces downward in the rail, the treads, when the rail-ends are welded together while in such alined positions, will remain in a common plane, and if there is any slight difference in the shapes of the cross-sections of the rails welded together there will be no misalinement at the tread, whatever error there is being lower down in the rail where it will not affect the continuity of the smooth surface on which the wheels have to run and where it can be readily corrected or otherwise taken care of if necessary.

This improved apparatus for alining rail-ends for welding may be employed either in connection with ordinary T-headed or bull-headed rails, or for alining grooved rails, etc., the main feature of the apparatus employed in each case being the provision of alining means engaging directly the treads of the rails.

This and other features of the invention which will be hereinafter described and claimed are illustrated in the accompanying drawings, in which—

Figure 1 is a transverse section of one type of apparatus embodying the invention, the section being taken in the line E—F, Fig. 2, and showing an apparatus adapted to operate upon T or bull-head rails; Fig. 2 is a plan of the same; Fig. 3 is a side elevation of the same.

Referring to Figs. 1 to 3 inclusive, these views illustrate the type of apparatus preferably employed for alining the heads of rails of the ordinary or bull-head type, two such rails being indicated at $a$, $a'$. The apparatus for alining the ends of these rails is preferably so constructed as to be capable of being secured as a whole to the ends of the rails to be alined. The main features of the apparatus are a frame adapted to be secured directly to the rails and alining means carried by the frame and embodying guide surfaces engaging respectively the tread surfaces of the different rails. These guide surfaces may be embodied in guides or alining members proper of any suitable type, these figures illustrating the construction preferably employed for bull-head rails. Two guides $b$, $b'$ are shown which embody at their under sides guide surfaces for contact with the tread portions of the rails. It will be obvious that the plane surfaces for contact with the tread of the rail will serve only as a means for alining those tread surfaces with which said guide surfaces come in contact.

It is important in alining rail-ends to obtain proper alinement not only in the line of these tread surfaces but also accurate alinement of the sides of the rail-heads corresponding to the straight line or definite curvature which the track and its rails are intended to have. For this reason guide-surfaces are preferably employed for alining abutting rails at one or both sides thereof, preferably at or near the heads of the rails, the means illustrated in these views for such purpose being guides $b$, $b'$, which have not only the horizontal guide-surfaces before referred to, but also substantially vertical guide-surfaces for engagement with opposite sides of the rail-heads. In the construction illustrated each of the guides $b$, $b'$ has in its under side a wide but comparatively shallow groove or guideway adapted to receive the upper portion of the corresponding rail-head and fit over the same, all of the walls of this guideway constituting guide surfaces for the purpose of alining its rail both horizontally and vertically of the track.

The guides or alining devices just described are preferably mounted in corresponding guideways in the under sides of the frame of the apparatus. The main members of this frame are preferably two end-pieces in the form of yokes or saddles adapted to straddle the rails and receive at their under sides the guides just described, the guideways in which such guides $b$, $b'$ are received being preferably in the under sides of these end-pieces, which may be of the type indicated at $c$, $c'$. The other main members of the frame are preferably heavy rods $d$, $d'$, mounted in parallelism with each other and secured to the end-pieces $c$, $c'$ in such a manner that the guides $b$ $b'$ will have all of their guide surfaces, horizontal, vertical, etc. in exact alinement with one another. The connection is preferably made in such a manner as to permit relative movement of said guides, etc., for the purpose of adjustment. In the construction illustrated the rods $d$ $d'$ are mounted in long parallel guide-ways near opposite edges of the yokes or saddles $c$ $c'$, the construction being such that the alinement of the guides will be maintained whatever may be the relative positions of the members $c$ $c'$ carrying said guides. For the purpose of obtaining and maintaining any desired adjustment of these parts toward or from each other the rods $d$ $d'$ are preferably threaded to receive nuts, such as $f$, for moving the parts toward or away from each other and for holding them in such positions. These nuts are shown as located in cutaway portions of the members $c$ $c'$, the construction being such that the cheeks of the nuts $f$ are always in engagement with the cheeks of these cut-away portions. By turning the nuts in one direction or the other the desired movement of the members $c$ $c'$ and the guides $b$ $b'$ may be obtained, the nuts and the coöperating cheeks of the parts $c$ $c'$ serving to maintain such adjustment when the nuts have been turned to the desired extent.

The frame formed by the parts $c$ $c'$ and $d$ $d'$ may be fastened to the rails $a$ $a'$ by any suitable means. The clamping means employed is preferably such as to hold the guides $b$ $b'$ firmly against the treads of the rails at all points in the lengths of the guides while also serving to clamp the frame as a whole in such a manner that there can be no relative movement between the frame and the rails either lengthwise or crosswise of the latter. In the construction illustrated separate clamping devices are employed in connection with each of the members $c$ $c'$, three open-sided clamps, such as $g$, being shown. Two of these clamps are mounted in cut-away portions of opposite sides of the members $c$ $c'$, while the third is mounted in a slot extending vertically through the same member. Two of these clamps are located at one side of the rail and the other at the opposite side, and each has a clamp screw for engaging the upper surface of the yoke substantially in the vertical axis of the rail, while the lower end of the clamp is toothed to grip the under side of the rail-head. When these three clamps carried by each yoke are tightened each yoke, guide and rail-end will be firmly clamped together and the treads of the two rails and the side of the rail-heads will be accurately alined. If the nuts $f$ are now turned in the proper direction for drawing the yokes and their guides together the ends of the rails may be readily brought into engagement without disturbing the horizontal alinement of the treads of the rails or the vertical alinement of the sides of the rail-heads. By means of this apparatus the rail-ends may be held in this position until the welding operation is finished.

What I claim is:

1. In an apparatus for alining rail ends for welding, the combination with a frame, of alining means carried by said frame and having two guide surfaces lying in a common plane and each located at a distance from the meeting faces to be welded and coöperative respectively with the treads of said rails, and means for clamping said guide surfaces to the treads of said rails.

2. In an apparatus for alining rail-ends for welding, the combination with a frame, of alining means carried by said frame and having a pair of guides lying in a common plane and each located at a distance from the meeting faces to be welded and coöperative respectively with the treads of said rails, and clamping means for coöperating with said guides and the under sides of the rail heads and drawing said guides and treads together.

3. In an apparatus for alining rail-ends for welding the combination with a frame, of alining means carried by said frame and having a pair of guides lying in a common plane and each located at a distance from the meeting faces to be welded and coöperative respectively with the treads of said rails, and a plurality of separately adjustable clamping devices for coöperating with said guides and the under sides of the rail-heads and drawing said guides and treads together.

4. In an apparatus for alining rail-ends for welding, the combination with a frame, of alining means carried by said frame and having a pair of guides lying in a common plane and each located at a distance from the meeting faces to be welded and coöperative respectively with the treads of said rails, and a plurality of open-sided clamps for coöperating with said guides and the under sides of the rail-heads and drawing said guides and treads together.

5. In an apparatus for alining rail-ends for welding, the combination with a frame, of alining means carried by said frame and having a pair of guides lying in a common plane and each located at a distance from the meeting faces to be welded and coöperative respectively with the treads of said rails, and two sets of separately adjustable clamping devices, one set for each rail, for coöperating with said guides and the under sides of the rail-heads and drawing said guides and treads together throughout the length of said guides.

6. In an apparatus for alining rail-ends for welding, the combination with a frame, of alining means carried by said frame and having guide surfaces both for the treads and for one side of said rails each of which guide surfaces is located at a distance from the meeting faces to be welded, and means for clamping said guide surfaces to said treads and side of the rails.

7. In an apparatus for alining rail-ends for welding, the combination with a frame, of alining means carried by said frame and having guide surfaces both for the treads and for the opposite sides of said rails each of which guide surfaces is located at a distance from the meeting faces to be welded, and means for clamping said guide surfaces to said treads and opposite sides of the rails.

8. In an apparatus for alining rail-ends for welding, the combination with a frame, of alining means carried by said frame and having a pair of alined guides coöperative respectively with the heads of said rails and each located at a distance from the meeting faces to be welded, each of said guides having guide-surfaces for engaging the tread and opposite sides of the corresponding rail, and means for clamping said guides to the treads of the rails.

9. In an apparatus for alining rail-ends for welding, the combination with a frame, of alining means carried by said frame and having a pair of alined guides each located at a distance from the meeting faces to be welded and each having guide grooves fitting over the treads and side portions of the rail-heads, and means for clamping said guides to the treads of the rails.

10. In an apparatus for alining rail-ends for welding, the combination with a frame, of alining means carried by said frame and having a pair of alined guides each located at a distance from the meeting faces to be welded and each having guide-grooves fitting over the treads and side portions of the rail-heads, and clamping means for coöperating with the upper sides of said guides and the under sides of the rail heads and drawing said guides and treads together.

11. In an apparatus for alining rail-ends for welding, the combination with a frame having alined undercut guideways therein, of guides in said guideways for engaging the treads of said rails each guide being located at a distance from the meeting faces to be welded, and clamping means for clamping all of said parts together.

12. In an apparatus for alining rail-ends for welding, the combination with a frame having alined undercut guideways therein, of guides in said guideways said guides having undercut guideways fitting the upper portions of the rail heads and each guide being located at a distance from the meeting faces to be welded, and clamping means for clamping all of said parts together.

13. In an apparatus for alining rail-ends for welding, the combination with a frame having alined undercut guideways therein, of guides in said guideways said guides having undercut guideways fitting the upper portions of the rail-heads and each guide being located at a distance from the meeting faces to be welded, and open sided clamps for engaging the upper sides of said frames and the under sides of the rail-heads and clamping all of said parts together.

14. In an apparatus for alining rail-ends for welding the combination with a frame, of a pair of alined guides carried by said frame and each guide being located at a distance from the meeting faces to be welded, means for clamping said guides to the treads of the rails, and means for adjusting said guides and rails toward or from each other.

15. In an apparatus for alining rail-ends for welding, the combination with a pair of main frame members each having a guide located at a distance from the meeting faces to be welded, of connecting means between said frame members for maintaining them and said guides in alinement and for adjusting them toward or away from each other while clamped to the rails, and means for clamping said guides to the treads of the rails.

16. In an apparatus for alining rail-ends for welding, the combination with a frame, of a pair of alined guides each located at a distance from the meeting faces to be welded and each carried by said frame and having alined undercut guideways fitting the upper portions of the rail-heads, means for clamping said guides to the upper portions of the rail-heads, and means for simultaneously adjusting said guides and rails toward or from each other.

In testimony whereof I have hereunto set my hand in the presence of two witnesses.

FELIX LANGE. [L. S.]

Witnesses:
OTTO KONIG,
WALTER VONNEGUT.